(12) United States Patent
Biondi et al.

(10) Patent No.: US 7,330,831 B2
(45) Date of Patent: Feb. 12, 2008

(54) SYSTEM AND METHOD FOR MULTIPLE ACCOUNT SINGLE SECURITY TRADING

(75) Inventors: Matthew Biondi, Jersey City, NJ (US); Robert S. Coira, Somerville, NJ (US); Joel D. Derstine, Chicago, IL (US); Christopher Panzica, New York, NY (US); Michael J. Kent, Maplewood, NJ (US); Theresa M. McNamara, Rockville, NY (US); Ann Kathleen Harding-Hesse, New York, NY (US)

(73) Assignee: CheckFree Corporation, Norcross, GA (US)

( * ) Notice: Subject to any disclaimer, the term of this patent is extended or adjusted under 35 U.S.C. 154(b) by 963 days.

(21) Appl. No.: 09/893,596

(22) Filed: Jun. 29, 2001
(Under 37 CFR 1.47)

(65) Prior Publication Data
US 2003/0154151 A1    Aug. 14, 2003

(51) Int. Cl.
*G06Q 40/00* (2006.01)
(52) U.S. Cl. ............. 705/36 T; 705/36 R; 705/35
(58) Field of Classification Search ......... 705/36 T, 705/36 R, 35
See application file for complete search history.

(56) References Cited

U.S. PATENT DOCUMENTS 6,115,697 A * 9/2000 Gottstein ............ 705/36 R
6,161,098 A * 12/2000 Wallman ............ 705/36 T
6,240,399 B1 * 5/2001 Frank et al. ........ 705/36 R
6,516,303 B1 * 2/2003 Wallman ............ 705/36 T
6,687,681 B1 * 2/2004 Schulz et al. ...... 705/36 T

OTHER PUBLICATIONS

Eliason, Alan "Online Business Computer Applications" 1983 (5 pages attached).*

* cited by examiner

*Primary Examiner*—James Kramer
*Assistant Examiner*—Kirsten Sachwitz Apple
(74) *Attorney, Agent, or Firm*—Sutherland and Asbill & Brennan LLP

(57) ABSTRACT

A system and method are provided for managing multiple investor accounts by rapidly computing and displaying the potential tax and gain/loss implications of proposed buy and sell transactions involving a single security. The invention allows users to identify criteria including tax selection liability rules and gain/loss rules for the proposed trades, and generate a trading ("What-If") report identifying the tax lots in each account that would satisfy the selection criteria. A failure report identifying tax lots that do not satisfy the selection criteria allows the user to either transfer such tax lots to the trading report or defer trading using messages transmitted in the future as a reminder to review the proposed transaction at a more appropriate time.

41 Claims, 15 Drawing Sheets

```
                          Tax Rate Schedule

Account ID    : MASS50         (MASS50)
Account Name  : MASS TEST ACCOUNT, SCENARIO 50

Federal Long Term    : 20.00
        Federal Medium Term  : 00.00
        Federal Short Term   : 39.60

State Long Term      : 5.00
        State Medium Term    : 0.00
        State Short Term     : 5.00

F1 Help     F3 Exit    SF4 Jump    SF5 Prev    SF6 Next    F10 Save
```

Fig. 2

GLTM WhatIf Template Reporting System

Template Name : MATTALL
Template Desc. :

Account Sort : SNAM                    Ascending
Tax-lot Sort : Purchase Date           Ascending Display All Tax Lots Display Account Fields - ROW :
SNAM                Long Name          Real GL YTD        RGL YTD % Eqty Display Account Fields - Row :
Shares Trd'd    Tot $ Trd'd    G/L Change F1 Help     F3 Exit          F9 Cycle          F10 Save

Fig. 3

```
                    GLTM WhatIf Input Worksheet

Security Symbol  : C
Description      : CITIGROUP INC                    COM

Trading Scenario

Desired Percentage : 70.00% of Holding
   Leveling Method    : Exact    -Buy or Sell Round Off Lots By  :      10.00       Bid Price :    60.000
   Rounding Method    : Up                Ask Price :    60.000
   Minimum Shares     :
   Hold Minimum of 1.00% Cash : Yes Apply Additional Tax-Filter Rules : Yes
Account Selection : Select Accounts
Reporting Options
   Template Display :     MATTALL - GLTM Testing Template
   Report Title     :    GLTM WHATIF - CITIGROUP INC F1  Help      F3  Exit     F8  Templates    F9  Cycle     F10  Go
```

Fig. 4

```
                    GLTM WhatIf Input Worksheet
─────────────────────────────────────────────────────────────
Tax-Filter Rules Sell Gains Only Sell Any Tax Term And
        Purchase Date is Greater Than Or Equal to  :  01/01/1900
        Purchase Date is Less Than or Equal To     :  06/24/2000

Do Not Sell Short-Term Gains That Roll over In    15 Days Or Less

Apply Wash Sale  : No

Apply Additional Gain/Loss Rules  : Yes
─────────────────────────────────────────────────────────────

F1  Help      F3  Exit              F9  Cycle    F10  Go
```

Fig. 5

```
                    GLTM WhatIf Input Worksheet
Gain/Loss Rules

Cost Greater Than Or Equal To   :
    Cost Less Than Or Equal To      :        0.00

Or
    % Gain/Loss Greater Than Or Equal To  :  0.00
    % Gain/Loss Less Than Or Equal To     :  0.00
         ("-" denotes a loss)
And
    Tax Liability Is Greater Than Or Equal To 0
                                 as a % Of Cost
Sell Priority  :  Individual Account FOFO Code F1  Help    F3  Exit              F9  Cycle    F10  Go
```

Fig. 6

| | | |
|---|---|---|
| 06/24/00 | TAX TESTING | |
| 1:19 P.M. | GLTM WHATIF - CITIGROUP, INC. | COM |

Acct Selection : 50 51 (2/2 Accouts Own C)

- Trade Scenario -                                     - Tax Filter Options -

C (172967101)      Price :   60.000          Sell Priority  :  Individual Account FOFO Level :  70.00% Of Holding (Exact)           Apply Wash Sale  :  No Round Lots :     10 (Up)                     Gains Only            , Any Tax Term Min Shares :      Min Cash :   1.0%          ST Gains Rollover Days  :  15

- Report Formatting Options -

Current Template : MATTALL - GLTM TESTING TEMPLATE

Current Sort   :  SNAM (Account), Purchase Date (Tax-lots)

Account Header:  <SNAM>  <Long Name>  <Real GL YTD>  <RGL YTD % Eqty>
                 <Shares Trd'd>  <Tot $ Trd'd>  <G/L Change>

Fig. 8A

| 06/24/00 | | | | TAX TESTING | | | | |
| --- | --- | --- | --- | --- | --- | --- | --- | --- |
| 1:19 P.M. | | GLTM WHATIF - CITIGROUP INC. | | | | COM | | |
| | | Acct Selection : 50 51 (2/2 Accounts Own C) | | | | | | |
| Orig Shares | Orig P Date | Orig P Cost | Orig %Prt | Shares Traded | New %Prt | New Shares | Realized Gain/Loss | % G/L |
| --------- | -------- | -------- | ------ | --------- | ------ | --------- | ------------- | --- |
| MASS50 MASS TEST ACCOUNT, SCENARIO 50 | | | | | | | $0 | 0.00% |
| -140 | $-8,400 | $1,700 | | | | | | |
| 50 | 09/25/97 | 2,000 | 11.1 | -50 | 0.0 | 0 | 1,000 | 50.0 |
| 50 | 08/30/98 | 2,500 | 11.1 | -50 | 0.0 | 0 | 500 | 20.0 |
| 100 | 12/19/98 | 5,500 | 22.2 | -40 | 13.3 | 60 | 200 | 9.1 |

Fig. 8B

| 06/24/00 | | | | TAX TESTING | | | |
|---|---|---|---|---|---|---|---|
| 1:19 P.M. | | GLTM WHATIF - CITIGROUP, INC. | | | | COM | |
| | | Acct Selection : 50 51 (2/2 Accounts Own C) | | | | | |
| Orig Shares | Orig P Date | Orig CPS | Tax Term | Market Value | Tax Liability | Unreal Gain/Loss | %Unr G/L |
| -------- | -------- | ------ | ------ | -------- | -------- | -------- | ---- |
| MASS50 MASS TEST ACCOUNT, SCENARIO 50 | | | | | | $0 | 0.00% |
| -140 | $-8,400 | $1,700 | | | | | |
| 50 | 09/25/97 | 40.00 | L | 3,000 | 100.00 | 1,000 | 50.0 |
| 50 | 08/30/98 | 50.00 | L | 3,000 | 50.00 | 500 | 20.0 |
| 100 | 12/19/98 | 55.00 | L | 6,000 | 50.00 | 500 | 9.1 |

TAX TESTING  
GLTM WHATIF - CITIGROUP, INC.     COM  
Acct Selection : 50 51 (2/2 Accounts Own C)  
TRADE SCENARIO FAILURES

| Trd | Account | Shares To Trade | Purchase Date | Tax Term | Cost/ Share | Market Value | Real Gain/ Loss | Tax Liab/ Share | Fail Reason |
|---|---|---|---|---|---|---|---|---|---|
| NO | * MASS50 | -60 | 12/19/98 | L | 55.00 | 3600 | 300 | 0.50 | OutObjective |
| NO | * MASS50 | -50 | 06/23/99 | L | 70.10 | 3000 | -505 | -1.01 | Gain/LossOnly |
|  |  |  |  |  |  |  |  |  | OutObjective |
| NO | * MASS50 | -100 | 02/21/00 | S243 | 65.05 | 6000 | -505 | -2.02 | Gain/LossOnly |
|  |  |  |  |  |  |  |  |  | OutObjective |
| NO | * MASS50 | -100 | 06/19/00 | S361 | 62.53 | 6000 | -253 | -1.01 | Gain/LossOnly |
|  |  |  |  |  |  |  |  |  | OutObjective |
| NO | MASS50 | -100 | 09/25/97 | L | 80.00 | 6000 | -2000 | -2.00 | Gain/LossOnly |
| NO | MASS50 | -500 | 08/30/98 | L | 70.00 | 30000 | -5000 | -1.00 | Gain/LossOnly |
| NO | MASS50 | -50 | 12/19/98 | L | 65.00 | 3000 | -250 | -0.50 | Gain/LossOnly |
| NO | MASS50 | -450 | 12/19/98 | L | 65.00 | 27000 | -2250 | -0.50 | Gain/LossOnly |
|  |  |  |  |  |  |  |  |  | OutObjective |

F7 Show Restrictions     F12 Toggle Header  
F3 Back To Results Screen     F8 Failed Mail     F10 Save Changes

Fig. 9

```
To: MATTB
Cc:
Bcc:
Future date: 20000629
      (Preface TOPIC with --- if urgent)
Topic: GLTM WHATIF FAILED - Sell Criteria - 06/24/00
─────────────────────── Message ───────────────────────
Current Templae : MATTALL - GLTM TESTING TEMPLATE
Current Sort : SNAM (Account), Purchase Date (Tax-Lots)
Account Header: <SNAM> <Long Name> <Real GL YTD> <RGL YTD % Eqty>
               <Shares Trd'd> <Tot $ Trd'd> <G/L Change>

Reason for failure: Sell Criteria
A file has been created in your directory containing accounts that
could not be traded for the noted failed reason. You can use the
command '\GLTMFILE' at any Account Selection prompt and enter the
file name listed below, to re-select these accounts.

Date of Failure: 05/24/00
File: FAILED.035
───────────────────────────────────────────────────────
F1 - Help   F3 - Abort Mail Message   F9 - Browse Roster   F10 - Send Mail Message
```

Fig. 10

SYSTEM AND METHOD FOR MULTIPLE ACCOUNT SINGLE SECURITY TRADING

FIELD OF THE INVENTION

This invention relates generally to the trading of securities and in particular to the automated creation of trading proposals to optimize the tax consequences of trading a single security held in multiple accounts.

BACKGROUND OF THE INVENTION

There is a growing interest today among investors in investing in individual securities rather than mutual funds. The professional money managers who advise these investors require tools that allow trading decisions to be made in response to rapidly changing market conditions. Tax considerations often play a major role in choosing which lots of stock to buy or sell in a particular transaction. For example, the length of time a lot of stock is held affects the net gain or loss from a transaction because the tax laws distinguish between long-term investments (e.g., stocks held for more than a year) and short term investments (e.g., stocks held for a year or less). Individual investors may wish not to sell a stock solely on the basis of unrealized gains if for example, it is close to rolling over from short term to long term. They may wish to delay the sale in order to take advantage of lower long-term tax rates. In terms of transaction timing, the investor may also wish to avoid the tax rules on so called "wash sales", transactions in which the same security is sold at a loss and bought, either before or after the sale, within a 30 day period.

Trading tools that have been developed to date for investors, and money managers, have focused on the analysis of trading scenarios for individual investors. One such tool, SAMS (Single Account Multiple Security) a product of CheckFree Investment Services, Inc. (the assignee of the present application) allows the user to view pertinent tax information and interactively liquidate or add new positions. The Windows display of the SAMS product is designed to aid portfolio managers in trading securities, a single investment account at a time in a tax efficient manner. Within an account, SAMS treats each tax lot of securities individually.

Briefly, SAMS provides only a single screen to assist the user, incorporating the following items:

A Portfolio Summary that provides an overall view of an investor's account by asset class (e.g., cash or cash equivalent), fixed income, common stock) and gains and losses, both long term and year to date;

A Portfolio Holdings (Standard) display that provides a detailed holdings report showing each tax lot of securities identified by holding period (including the number of days to roll-over), and indicating the unrealized gain or loss for each tax lot based on current market price;

A Portfolio Holdings (Tax Calcs) display similar to the standard portfolio holdings display described above, but with the tax liability and tax adjusted value shown for each tax lot of securities with a long or short term gain (no tax rate applied to losses); and A Tax Adjustor that summarizes all the holdings in an account, and allows the after tax effect of trades to be interactively evaluated, calculating changed values of individual holdings and the overall account, as securities are liquidated or added. Trading of individual lots can be based on a number of shares to be traded, dollar value of the trade, or percentage of portfolio.

SAMS does not automatically compute a trading proposal for a given account based on a set of rules. Rather it is a calculating tool that allows the user to interactively develop an advantageous scenario for the investors based on tax consequences and other investor objectives.

It must be emphasized that SAMS and similar tools are designed to aid in formulating trading scenarios for individual accounts, one at a time, each across the multiple tax lots of multiple securities held in the account being evaluated. However, for money managers that are responsible for multiple accounts, numbering perhaps in the tens of thousands, there is also a need for a tool that can be used to develop trading proposals across the plurality of accounts for a single security. Often the desirability of trading a particular security is driven by rapidly changing market conditions, and trade decisions must be made quickly. In such situations a tool like SAMS could be applied to each account individually to determine the most beneficial trading proposal for each in the security in question. But such a serial approach could take hours or even days for a large client base. By that time the circumstance that originally motivated the desire to trade may have already changed. Instead, what is needed is a tool that can rapidly formulate trading proposals in a single security for a large number of accounts simultaneously taking into account the tax situation and objectives of each investor.

Objectives

Therefore, it is an objective of the present invention to provide a system for generating trading proposals for tax lots of a single security across multiple investor accounts, optimized to take into account the tax consequences of each trade.

It is another object of the present invention to provide a system for generating trading proposals for tax lots of a single security across multiple investor accounts, that allows screening tax lots according to selected trading objectives for all selected accounts.

It is yet a further objective of the present invention to provide a system for generating trading proposals for tax lots of a single security across multiple investors, that take into account time sensitive tax events such as "roll-overs" from short term to long term, and "wash" sales.

It is yet a further objective of the present invention to provide a system for generating tracking proposals for tax lots of a single security across multiple investors that allows screening of tax lots according to selected objectives of individual accounts.

The above stated objectives, as well as other objectives, features and advantages, of the present invention will become readily apparent from the following detailed description, which is to be read in conjunction with the appended drawings.

SUMMARY OF THE INVENTION

The present invention is directed to the generation of a securities trading proposal for tax lots of a single security to be bought or sold for a plurality of investor accounts. In particular, the trading proposal is based on selection criteria using gain/loss and tax considerations to determine which tax lots of the security are to be traded in each account. A system embodiment includes a memory to store tax lot and other information for investor accounts, and a processor configured to receive selection criteria from a user input device such as a keyboard, to generate a trading proposal based on the selection criteria for tax lots of a single security, and to produce display output consisting of the generated securities trading report for an output device such as a monitor or printer.

The processor may be part of a server connected through a wide-area or local area network to the input and output devices, which may be accessed through a personal computer operating in a terminal-emulation mode. Alternatively, the processor, input device and output device may be part of an individual computer work station or personal computer.

In the preferred embodiment, the processor, running an application program called MASS (Multiple Account Single Security), allows a user, through a series of input screens, to input selection criteria including an identification of the security to be traded, tax lot criteria, and account criteria.

The tax lot criteria include such basic trading scenario factors as size of the blocks to be traded and desired percentage of holding to be sold or retained in each account. In addition, the user may specify through the input screens additional tax filter rules and gain/loss rules. The tax filter rules include selling gains only, losses only or both; selling short term only, long term only, or any term; selling tax lots with purchase dates greater than/less than or equal to a certain date; not selling short term gains that will roll-over within a specified number of days; and not selling a tax lot that would create a potential violation of the IRS' wash sale rules.

The user may also input additional gain/loss rules which include criteria for selecting tax lots to be traded based on purchase cost per share, percentage gain or loss, and tax liability greater than/less than or equal to a certain amount.

The present invention also allows the user to select either all investor accounts to be included in the trading proposal, or to select a plurality of the accounts based on information in each account profile.

In order to generate a securities trading proposal, the processor is configured to retrieve (i) stored tax rate information (either default rates or rates input by the user for each account) (ii) security price information (generally obtained from commercial stock quotation services), and (iii) stored tax lot information, including purchase date and purchase price of the securities. In the preferred embodiment, the MASS software does a preliminary screening of tax lots to determine how many in each account are available for sale according to the selected percentage of the holding to be sold and the specified order of sale (e.g. FIFO, LIFO). The MASS application then computes gain/loss and tax liability information for each tax lot being considered. Tax liability information includes the tax that would be due on any sale gain, as well as the time remaining for a roll-over from short term to long term and any potential wash sale violation.

Following the gain/loss and tax liability calculations the MASS application causes the processor to apply the inputted selection criteria to the resulting gain/loss and tax liability information, and output a trading proposal including computed gain/loss and tax liability information for tax lots that satisfy the user's selection criteria. It will be recognized that some or all of this selection criteria screening could, if desired, be performed prior to performing the gain/loss and/or tax liability calculations. In the preferred embodiment, the format and content of the trading proposal report can be customized by the user.

In another aspect of the invention, the processor also outputs a failure report identifying and providing computed gain/loss and tax liability information for tax lots that fail to satisfy the selection criteria. The transaction with regard to a particular account may fail because the account chosen does not have a position in the designated security, but this will only be reported in the header of the trading proposal report.

In the preferred embodiment, only the tax lots that initially meet the percentage of equity to be sold (which could be the percentage of the total account, the holding, the actual equity, a target equity, an actual fixed income, or a target fixed income etc.) and sell priority (e.g., FIFO, LIFO) are considered in applying the tax filter rules and the gain/loss rules, so that other tax lots that meet these latter criteria will still fail to be included in the trading proposal because they are considered outside the objective of the trading scenario.

In a further aspect of the invention, the user has the option of directing the processor to move a tax lot identified in the failure report to the list of tax lots in the trading proposal. For example, the investor may wish to sell all of his or her holdings in a certain security even though a small wash sale loss affecting one lot may not be deductible.

In yet a further aspect of the invention, the user has the option of directing the MASS software application to prepare messages that will be sent to him or herself in the future as a reminder to review tax lots selected from those identified in the failure report, at such a time as the cause of the failure to meet the selection criteria may no longer be applicable. This feature may be particularly useful in regard to trading failures related to time dependent criteria, such as short-to-long-term rollover, and wash sale violations.

BRIEF DESCRIPTION OF THE DRAWINGS

FIG. 2 shows a screen for inputting tax rate information applicable to an account according to the present invention;

FIG. 3 shows a screen for inputting reporting template information according to the present invention;

FIG. 4 shows an input worksheet for selecting a security and trading scenario according to the present invention;

FIG. 5 shows an input screen for selecting tax filter rules according to the present invention;

FIG. 6 shows an input screen for selecting gain/loss rules according to the present invention;

FIGS. 8A-8D show the header, body and footer of a typical trading proposal report generated in accordance with the present invention;

FIG. 9 shows a typical trade scenario failure report generated in accordance with the present invention;

FIG. 10 shows a typical failure e-mail generated for future transmission in accordance with the present invention.

DETAILED DESCRIPTION OF THE INVENTION

The present invention is directed to a software-driven system that enables users to manage multiple investor accounts by rapidly computing and displaying potential tax and gain/loss implications of proposed (so-called "what-if") trades of a single security at the tax-lot level and by providing gain/loss information based on short, medium and long term capital gains tax rates. Using the functionality of the inventive system, users have the ability to generally do the following:

(1) Input for each investor account the applicable Federal and State tax rates to be used in tax related calculations (The system has been written to account for a medium term rate, although the U.S. tax code only includes short term and long term capital gain rates at the present time).

(2) Select or restrict accounts to be traded based on tax liability and/or gain/loss profiles.

(3) Select or restrict tax lots to be traded based on tax term, purchase data, number of days until term rollover, or tax liability.

(4) Control content and/or format of information reports outputted by the system as a result of applying the selection criteria to the database of investor holdings and/or the selected template parameters.

(5) View what-if trades that would fail due to term, gain/loss or potential liability restrictions.

(6) Override imposed restrictions by converting a failed trade into a selected trade.

(7) Send future e-mails as a reminder to re-evaluate failed trades at a more appropriate time.

Figure 1:
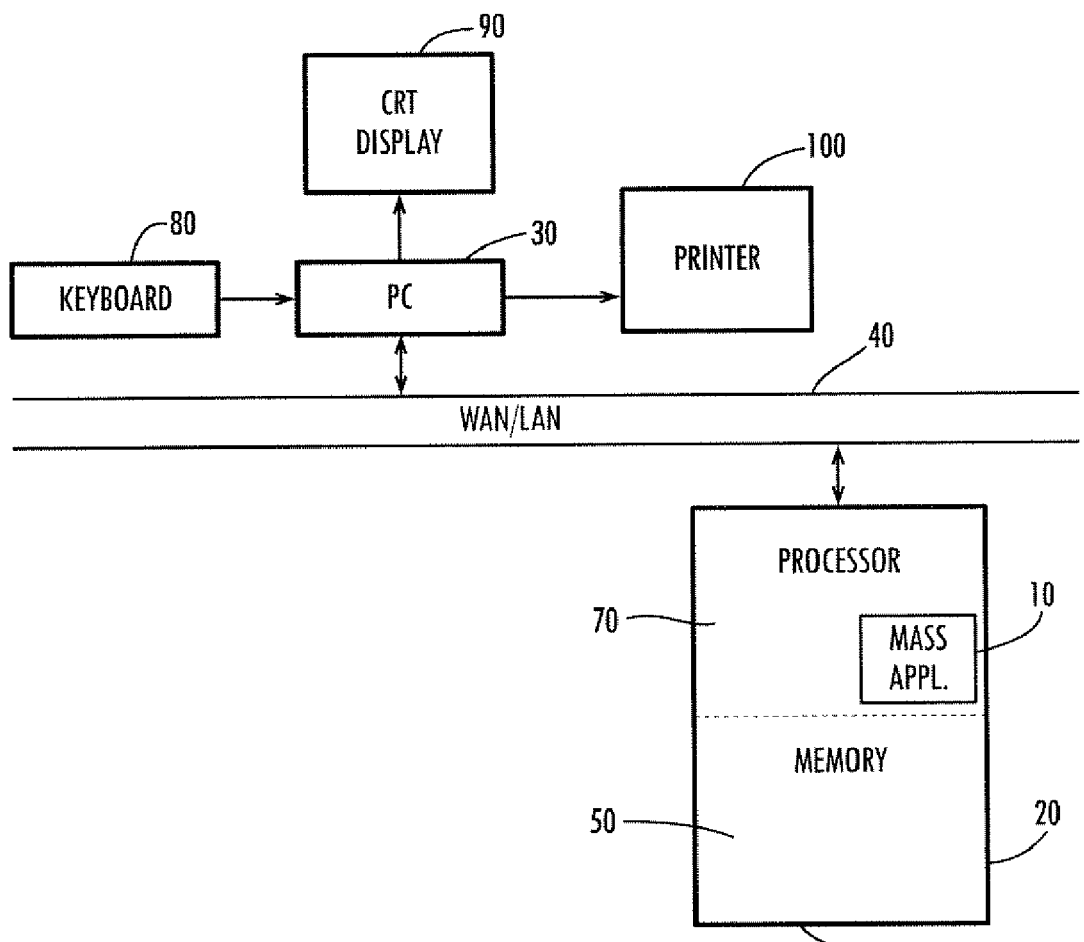
FIG. 1 shows a system for generating a trading proposal for a single security across multiple investment accounts according to the present invention.

As shown in FIG. 1, the inventive system that provides this functionality, (described in further detail below) is preferably implemented as a computer software application 10, running on a server 20, which is connected to a number of personal computers (PC's) 30 operating in the terminal-emulation mode through a wide-area or local-area network 40. Server 20 includes memory device 50 that stores investor information (e.g., name, address, social security number) and account information and transaction history (e.g., securities purchased, sold, dates and prices of purchases and sales) information, that can be called by processor 70 within the server to generate trading proposals based on the selection criteria input by the user through input devices at each PC, such as keyboard 80. Reports can be displayed on CRT 90, printed on printer 100, or otherwise output for further use.

In the preferred embodiment described herein, the user works interactively with the software-implemented What-if trading tool (known as MASS, or Multiple Accounts for a Single Security) through a series of Windows-based screen displays.

FIG. 2 is the screen display of the Tax Rate Table, which enables the user to enter specific federal and/or state tax rates for each investor account, if known. If desired, the screen could be easily modified such that the rates are entered for each investor only once and then automatically applied to each investor account by the system. All tax calculation for the particular investor account will be based on these rates. Default values are the current highest marginal rates for federal taxes, 39.6% and 20% for short and long term respectively, and 0% for state rates. The tax rates are editable on the screen.

MASS's reporting template system allows the user to control the content and format of information displayed on the What-If Results Screen (discussed in further detail below). A default template for the What-If Results Screen is used if the user does not specify another. Otherwise the user can cycle through and select from the available display options shown in FIG. 3. Table 1, below summarizing exemplary settings available in the What-If Reporting Template screen.

TABLE 1

Template Settings

| Setting | Description |
| --- | --- |
| Account Sort | Sort by any account field |
| Tax-Lot Sort | Purchase Date, Quantity, Cost/Share, Gain/Loss, Market Value, % Gain/Loss, Or Tax Liability at the tax-lot level |
| Tax-Lot Display | Report on all tax-lots, or only those requiring change in the What-If scenario |
| Field Selection | Select the account profile fields that should appear in the two rows above each account's detail in the What-If Results report. |

The set-up of a trading scenario properly begins when the user accesses the Input Worksheet Screen shown in FIG. 4, and specifies the Ticker, Cusip or Sacus identifier for the security to be traded. Bid and asked price fields are then filled in automatically based on daily or more frequent security price updates available from one of the existing commercial stock quotation services.

Desired Percentage—The Desired Percentage field answers the question: When the trade is complete, what percent of the account's holding of the selected security does the investor want to retain Of—the default for the Of field is Total. One of the following possible values can be selected: Total, Actual Equity, Target Equity, Actual Fixed, Target Fixed or Holding.

For example, 10 tax-lots of XYZ, each being 100 shares, and each being 1% of the portfolio (10% of the investor's holdings are XYZ). Six of the tax-lots have been held Long Term (taxable at 20%), 4 have been held Short Term (taxable at 39.6%). The investor would like to sell 50% (from 10% to 5%) of the holding and only sell a tax-lot if the tax-lot is Long Term.

In this case, What-If logic sells 50% of the total holding (1,000 shares), defaulting to First In, First Out logic (the default is whatever Sell Priority is specified in the account profile). It sells 500 shares of the long-term holdings, completely liquidating five of the tax-lots. (Creating five unique taxable events and leaving one unrealized Long Term holding position untouched).

In this example, if there were instead four Long Term lots and six Short Term lots the What-If logic would sell all 4 Long Term tax-lots (400 shares).

This does not satisfy the 50% criteria (should have sold 500 shares). The remaining Short Term lots would show on the Failure Screen discussed below, and the account would be flagged so that the investor would be aware that there was activity in this security, just not enough to satisfy all of the criteria. If desired, all other lots which fail to meet the selection criteria could also appear on the Failure Screen.

Leveling Method—The leveling method defines which level the investor would like to buy, sell or buy and sell. These methods typically use the rounding logic entered in the Rounding fields. Exemplary leveling methods are shown in Table 2 below.

TABLE 2

Leveling Method

| Leveling Method | Description |
|---|---|
| Exact | Both buy and sell. Hold exactly this amount. |
| Minimum | Buy Only. Accounts must hold the following minimum percentage, if not, acquire it. The only tax implication here is a possible wash sale violation. |
| Maximum | Sell Only. Do not hold more than this percentage, if so, sell down to it. |
| Unowned | Buy only for accounts that don't own this security. |
| Trim | Reduce the size of the position. |
| Add | Add to the size of the position. |

Round Off Lots By—Allows user to select the number to round off the lots. Valid inputs are 1-10,000 depending on the type of security.

Rounding Method—Given a number to round lots to, this parameter determines system round up, down or to the nearest lot size specified above.

Minimum Shares—Enables the user to specify minimum number of shares to be traded. A user may round to 5 shares, but only want to make a trade if at least 100 shares are being bought/sold. 100 shares would be the minimum size of the trade. For example, 100, 105, 110 shares could each be traded.

Hold Minimum of X % of Cash—X % defaults to 1% and can be edited. Entering No into the Yes or No field will ignore this.

Bid/Ask Price—Defaults to close of business price (or price 15 minutes delayed, if available). These fields can be edited.

Apply Additional Tax-Filter Rules—Yes or No. If Yes is selected, the Tax Filter Rules Screen, discussed in detail below is displayed.

Account Selection—The two options in the Account Selection field are: Select Accounts (from the available files) or All Accounts. If Select Accounts is selected, a standard account selection query window will appear.

Reporting Options/Template Display—As discussed above, users may define what fields they would like to see on the output report, how accounts are sorted, how tax-lots are sorted within an account and which tax-lots to display.

After all the information is edited/entered in the What-If Input Worksheet, the next screen displayed will depend on the selections already made, that is:

a) If Yes was selected in the Apply Additional Tax-Filter Rules field, the Tax Filter Rules Screen will appear.

b) If No was selected in the Apply Additional Tax-Filter Rules field and Select Accounts was selected in the Account Selection field, the Account Selection Window will appear.

c) If No was selected in the Apply Additional Tax-Filter Rules field and All Accounts was selected in the Account Selection field, the block of accounts will be created and the output screen defined in the chosen template will be displayed.

FIG. 5 shows the screen used in the preferred embodiment through which the user can select the Tax Filter Rules to be applied in the selection of investor holdings for trading. The fields on the Tax Filter Rules Screen and the possible options available for each are:

Sell—the options for the Sell field are: Gains and Losses, Losses Only, and Gains Only.

Tax Term—While there are seven possible combinations of Long, Medium and Short term, the choices under the present tax code are:
Any Tax Term;
Short Term Only; and
Long Term Only.

And/Or—The AND operator narrows a query, (i.e., all criteria linked by the AND operator needs to be true in order to be included in the query result.) The OR operator expands a query (i.e., criteria which are individually true are included in the query result).

Purchase Date is Greater Than or Equal to—The default for this field is 01/01/1900. This field can be edited.

Purchase Date is Less Than or Equal to—The default for this filed is TODAY. This field can be edited.

Do Not Sell Short Term Gains that roll over in "X" days or less—The default for this field is 0. If a Short Term tax-lot with a gain is rolling over to Long Term in X days or less, then exclude this lot from trading eligibility. Any lot that is excluded for this reason will write out to the Failure Screen discussed below.

Apply Wash Sale—the default for this field is Yes. If Yes is selected, and a tax-lot is in potential violation of the Wash Sale Rule, the tax-lot will be displayed in the Failure Screen.

Apply Additional Gain/Loss—The default for this field is Yes. If Yes is selected, the Gain/Loss Rules Screen will be displayed.

After all the information is edited/entered in the Tax Filter Rules Screen the next screen displayed will depend on the selections already made, that is:

(a) If Yes was selected in the Apply Additional Gain/Loss Rules field, the Gain/Loss Rules Screen will appear.

(b) If No was selected in the Apply Additional Gain/Loss Rules field and Select Accounts was selected in the Account Selection filed in the previous Input Worksheet Screen, the Account Selection Window will appear.

(c) If No was selected in the Apply Additional Gain/Loss Rules field and All Accounts was selected in the Account Selection field in the first screen, the block of accounts will be created and the output screen defined in the chosen template (discussed above) will be displayed.

The Gain/Loss Rules Screen of the preferred embodiment is shown in FIG. 6. The user is able to restrict lots by gain/loss information by entering values in this screen. As with the other screens discussed in this application, the options presented are exemplary, and not intended to be comprehensive.

The default value for the field for each filter on this screen is 0.00 or 0, which turns each of these filters off. A non-zero value must be entered in the field for the filter in order to activate that particular filter (e.g., in order to activate the "% Gain/Loss Greater Than or Equal to" filter, the user must enter a non-zero value in that field).

Cost Greater Than or Equal to—The default for this field is 0.00.

Cost Less Than or Equal to—The default for this field is 0.00.

% Gain/Loss Greater Than or Equal to—The default for this field is 0.00

% Gain/Loss Greater Than or Equal to—The default for this field is 0.00

And/Or—Select either the And operator or the Or operator in this field. Note that the AND operator is not applicable between the Cost and % Gain/Loss sections, as there is a linear relationship between cost and % gain at a given price.

Tax Liability is—Select either the Greater or Less in this field.

Than or Equal to—The default for this field is 0.00.

As—exemplary options for this field are:
  (i) % of Cost—cost of the Tax Lot
  (ii) % of Market Value—Market Value of the Tax Lot
  (iii) $ Value—An absolute dollar value
  (iv) $ Value/Unit—An absolute dollar unit per share Sell Priority—exemplary options for this field are:
  (i) Individual Account sell order (FOFO) Code (default)
  (ii) FIFO (First-In First-Out)
  (iii) LIFO (Last-In Last-Out)
  (iv) Minimum Tax
  (v) Maximum Tax
  (vi) High Cost
  (vii) Average Cost Under the Minimum Tax option, tax lots are selected in ascending order of tax liability per unit, regardless of tax term. Under the Maximum Tax option, tax lots are selected in descending order of tax liability per unit, regardless of tax term. High Cost means that tax lots are selected in descending order of unit price (price per share) regardless of the tax term or effective tax rate. Under the Average Cost option equal portions of all tax lots are liquidated. The user may, if desired, be limited to only selling long term gains under this option.

After all the information is edited/entered in the Gain/Loss Rules Screen, the next screen to appear will depend on the following:
  (a) If Select Accounts was selected in the Account Selection field in the Input Worksheet Screen, the Account Selection Window will appear.
  (b) If All Accounts was selected in the Account selection field in the first screen, the block will be created and the output screen (described below) will be displayed.

Figure 7:
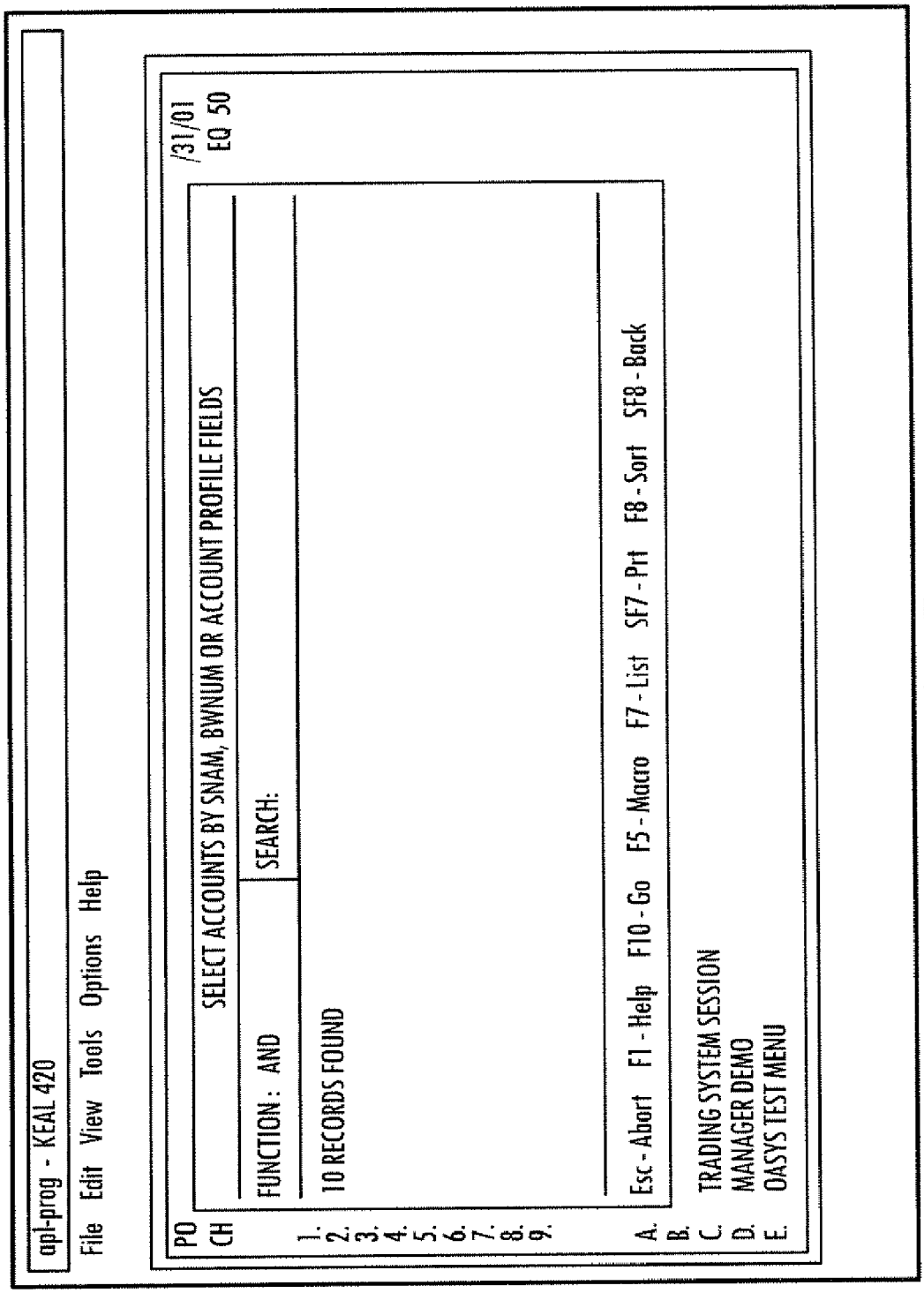
FIG. 7 shows an input screen for selecting investor accounts according to the present invention.

FIG. 7 shows an exemplary Account Selection window that would appear if the user elects to limit the investor accounts to which the trading proposal generated by MASS will apply. Accounts can be selected on the basis of account name, number and/or any other information stored in the fields of the investors' account profiles.

Once all of the information required by the Input Work Sheet Screen, the Tax Filter Screen Gain/Loss Rules Screen, and the Account Selection Screen, is inputted, the MASS application retrieves the necessary stock, price, tax lot and tax rate information for the selected accounts. In the preferred embodiment, the MASS software does a preliminary screening of tax lots to determine how many in each account are available for sale according to the selected percentage of the holding to be sold and the specified order of sale (e.g. FIFO, LIFO). Thereafter, MASS performs the necessary calculations to determine gains, losses, holding terms and applicable taxes for each tax lot of securities, applies the selected tax and gain/loss criteria and outputs a trading proposal (What-If Report) summarizing the results.

The order in which selection criteria are applied can be varied according to the circumstances, as explained below in connection with the discussion of several examples that illustrate how MASS might be used.

There are three sections to the What-If Report—a header, a body and a footer. The header, shown in FIG. 8A, contains pertinent information about the trading scenario. In the preferred embodiment the header is collapsible, and in the collapsed mode, only the two top lines are shown. The ten lines that collapse restate the information entered on the three input screens.

The body of the What-If Report displays the trading scenarios generated by the system. In the embodiment shown, the body is comprised of two 80-character screens that can be toggled between using the left and right arrow keep on the terminal keyboard. Examples of left and right screens for a report body are shown in FIGS. 8B and 8C, respectively. The body contains both individual account information and tax lot information. The specific information displayed in the body of the report, as well as its format can be specified by the user using the report template system previously described.

The split screen embodiment shown in FIGS. 8B and 8C is only exemplary. It reflects the "terminal emulation mode" environment under which the MASS application was developed, and limitations due to the small display devices available in that environment. However, the present invention is easily adaptable to a more sophisticated Windows or WEB application, and with the larger size and resolution of present day displays, a continuous 160-character wide display could, for example, be supported with horizontal scrolling as necessary, thereby eliminating the need for split screen toggling.

In the specific example shown in FIGS. 8A-8C, two accounts have been selected, from each of which exactly 70% of the holding is to be sold, applying tax lots with gains only, either short term or long term (see header in FIG. 8A). The body of the report (FIGS. 8B-C) shows that account 50 has three tax lots of the designated stock, all held long term, and all of which have a realized gain. The selection criteria are satisfied in this example by selling all of the stock in the first two tax-lots, and 40 shares from the third lot (the default sell priority of the individual account is specified, and is apparently FIFO) Total shares sold, selling price, and realized gain for the account are summarized in the first line directly above the tax-lot detail. As discussed above, the user has a great deal of flexibility in determining both the content and format of the "What-If" Results Report.

Figure 8D:
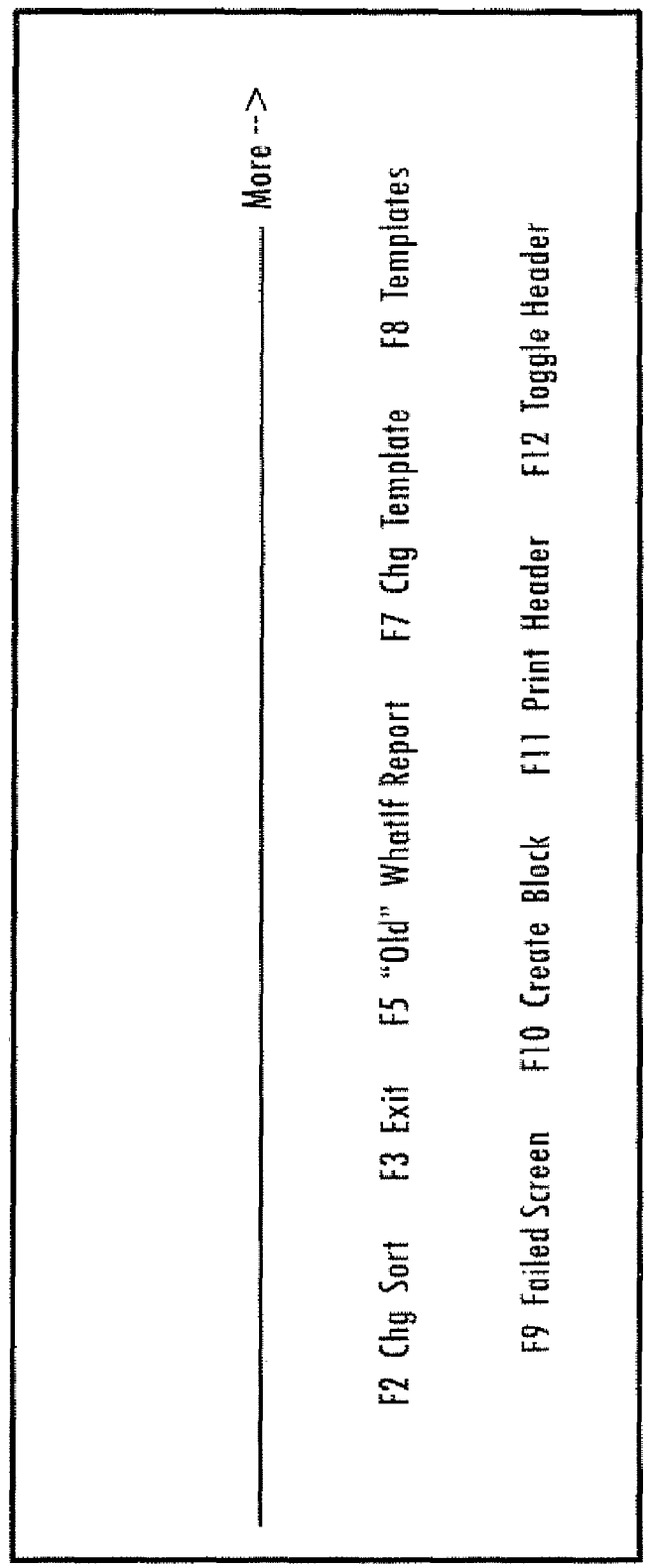

The footer of the exemplary What-If Report, shown in FIG. 8D, lists function keys that allow the user to navigate between the screens of the MASS application, so that additional trading proposals can be generated. In a more modern graphical user interface, these navigation functions could be invoked, for example, as selectable pull-down menu items, buttons or hyper-links.

If any selection criterion was chosen that prevents an account from trading that would have otherwise traded tax-lot(s) or a partial lot, or an account chosen does not own the designated security, a What-If Failure Screen, like the example shown in FIG. 9, will be produced. The preferred embodiment currently recognizes 11 possible reasons for failure. As tax laws change or investor strategies expand, the number of reasons for failure may change.

It should be noted that the user is given the ability to manually override failed trades, thus deciding to trade them and post those selected tax-lots back to the What-If Report. In the disclosed embodiment, this is accomplished by entering YES in the TRD (Trade) column next to the tax-lot which is being overridden.

The eleven reasons mentioned above as the basis for a failed trade may be summarized as follows:
  (i) Not owned. If an account chosen doesn't own a given security, it will fail immediately. This does not appear on the failure screen except in the header, where it states that X out of Y accounts own the stock in question (see FIG. 3B).

(ii) None exist or not enough tax-lots to satisfy Gains Only, or Losses Only but there is a tax-lot with a Loss or a Gain remaining in the security.

(iii) None exist or not enough tax-lots to meet the tax term criteria. For example, one would like to sell 70% of his or her XYZ holding, long term only, but only 60% of his or her XYZ holding is long term, 40% is short term.

(iv) Purchase date failure. If a specific purchase date range is chosen, and the account owns tax-lots outside of that range, they will fail.

(v) Term Rollover. If the user has restricted short term lots from trading if they are rolling over to long term in a specified number of days, those lots that are rolling over in X days or less will fail.

(vi) Wash Sale. In the event that a purchase or sale would trigger a wash sale violation, this would cause the trade to fail. This is the only possible reason a purchase would fail.

(vii) Cost failure. If the user specifies a cost range, and there are holdings, but not within that cost range, they will fail.

(viii) Percent gain loss failure. If a gain or loss range is specified, and a tax-lot fails to meet that criteria, it will fail.

(ix) Tax Liability failure.

(x) Outside Objective. For example, the tax-lot should not be considered because the investor is trimming a position, and selling the lot would 'over-trim'.

(xi) General restrictions. Inherent to the MASS application is the ability to restrict by gain, loss or gain loss profiles by tax term or gross. For example, the user may restrict an account from realizing more than 3% of its equity value in short-term gains.

Failed Mail is a feature of the present invention that can be accessed through the Failure Screen. In the preferred embodiment, users have the ability to have e-mail messages automatically sent regarding any failed tax-lots, on a future date to be determined by the user. The user can utilize the e-mail as a reminder to trade these tax-lots at a more opportune time (for example, when the tax-lots are long term holdings, instead of short term holdings).

When the Failed Mail option is accessed, a pop-up menu is displayed, which lists the failure reasons that apply to the block. When selecting an option (example: Wash Sale), all account ID's that failed to trade because of a wash sale violation are displayed on the screen. After the selection process is complete, the user may create an e-mail reminder, an example of which is shown in FIG. 10. In addition to the e-mail message, a file is created, named FAILED.XXX. This file contains the account identifiers of the accounts that failed. The user has the option to send an e-mail in the future, which contains all the information the user will need to recreate the trade, and the account selection process can be read in the FAILED.XXX file.

For example, if 40 accounts failed for a wash sale violation, the user could send himself or herself an e-mail message to be received once the wash sale violation has expired. The user could then recreate the trade scenario for only those 40 accounts that were in wash sale violation. It is possible that some of the tax-lots will still be in violation of the wash sale on the second attempt to trade. In this case, the user can repeat the process.

The tax-lots that are still in violation of the wash sale will show up on the Failure Screen. In the Failure Screen the user can create a new Failed Mail and trade the failed tax-lots when the tax-lots are not in wash sale violation. This process can be repeated as many times as necessary to complete the sale of the security.

The following series of examples discloses how the system of the present invention evaluates various types of user inputs to generate trading proposals.

The examples assume a holding of 10 tax-lots of XYZ, each are 100 shares, each being 10% of the investor's holdings in XYZ. Six of the tax-lots have been held long term (taxable at 20%), four have been held short term (taxable at 39.6%).

TABLE 3

Example 1

| Order of Purchase | Before What-If | Tax Terms | Unrealized Gain Exs. ½, all Gains | After What-If |
|---|---|---|---|---|
| 1 | 100 | L | +10 | 0 (Sells 100) |
| 2 | 100 | L | +9 | 0 (Sells 100) |
| 3 | 100 | L | +8 | 0 (Sells 100) |
| 4 | 100 | L | +7 | 0 (Sells 100) |
| 5 | 100 | L | +6 | 0 (Sells 100) |
| 6 | 100 | L | +5 | 100 |
| 7 | 100 | S | +4 | 100 |
| 8 | 100 | S | +3 | 100 |
| 9 | 100 | S | +2 | 100 |
| 10 | 100 | S | +1 | 100 |
| Total Remaining | | 600 L 400 S | | 100 L Sells 500 400 S-500 remain |

In Example #1, shown in Table 3, above, the user would like to sell down to 50% of the holding, but only sell a tax-lot if the tax-lot is long term. The user may achieve this objective by choosing a variety of selling options, either as a percent of Equity, Fixed, Total, or Holding. The important concept here is that it is a partial sale. For this simple example 50% of the holding is being sold and the additional tax criteria of Long Term Gains only was entered. The Account's Sell Priority code is First In, First Out (FIFO).

The evaluation is done as follows:

If the user is selling to 50%, he or she is selling 50% of the account's holdings in XYZ. Fifty percent of the holding is chosen according to the FIFO coding of the account. In this case, the first 5 tax-lots purchased (the first 50% 'in') are selected. Then, the additional tax filter rules, Long Term Only and Gains Only are applied. Here, all 5 of the tax-lots would be traded as each meets both the Long Term and Gain criteria.

The Sell Priority field normally associated with each investor account profile may be overridden on the Gain/Loss Rules Screen, as disclosed above. This is very important and will be discussed in further detail below in connection with failure reasons.

Example #2, shown in Table 4, is identical to Example #1, except that the Sell Priority codes for all the accounts are overridden with Last-In, First-Out (LIFO). Again, the objective is to sell 50% of the holding, long term gains only.

In this example, the $10^{th}$, $9^{th}$, $8^{th}$, $7^{th}$ and $6^{th}$ tax-lots would be selected in purchase order. They are the 50% that are Last In, First Out. However, applying the tax criteria Long Term Only, Gains Only, only one of the tax-lots would trade because the first four fail the long-term criteria; only the $5^{th}$ one (the sixth lot purchased chronologically) meets that criterion. All 10 tax-lots meet the gain criterion, so none fail for that reason.

One tax-lot would show on the trading screen and four would show on the failure screen with failure reasons "Tax Term" (see below). In the event that "Show All Tax-Lots" is chosen on the viewing template (FIG. 3), the remaining 5 long term lots would also show on the failure screen as "Outside Objective". They would not be evaluated for Long Term Gains because they are out of the scope of 50% Last In, First Out requirements.

Assuming "Show All Lots" was chosen, the failure screen would look as follows:

All 900 remaining shares would be displayed. (The lot sold would not show on the failure screen. It is included in Table 4 for illustrative purposes only.)

TABLE 4

Example #2

| Trade | Before What-If | Tax Term | Unrealized Gain Exs. ½, all Gains | After GLTM What-If and Failure reason |
|---|---|---|---|---|
| NO | 100 | L | +10 | 100 Outside Object |
| NO | 100 | L | +9 | 100 Outside Object |
| NO | 100 | L | +8 | 100 Outside Object |
| NO | 100 | L | +7 | 100 Outside Object |
| NO | 100 | L | +6 | 100 Outside Object |
| YES | 100 | L | +5 | (0 Sold 100) |
| NO | 100 | S | +4 | 100 Tax Term |
| NO | 100 | S | +3 | 100 Tax Term |
| NO | 100 | S | +2 | 100 Tax Term |
| NO | 100 | S | +1 | 100 Tax Term |
| | Total | 600 L | | 500 L Sells 100 |
| | Remaining | 400 S | | 400 S-900 remain |

If "Only Those Requiring Change" was selected in Display Options on the Template Screen in place of "Display All Tax-Lots", only the lots whose failure reason is Tax Term, would display on the failure screen.

Prior to any calculations, the number of accounts in the chosen account selection, that own the security, is evaluated. The importance of this logic will become clear in connection with the more complicated examples following the discussion of Failure Reasons, below.

In Example 2, "Show All Tax-Lots" was chosen in the Template Screen and one tax-lot would show as a trade and nine would show as failed. Four would fail because they did not meet the tax-term criteria, and the five other Long Term lots would fail because they were outside the objective which is sell 50% of the LIFO tax lots.

In this case, the objective of selling 50% of the holding was not met, and five Long Term tax-lots were not evaluated because they were 'outside the objective' of selling 50% of the holding from lots chosen on a Last In, First Out basis.

It is important to mention here how these tools determine what to sell. First, the number of shares to be traded is determined by the user input to the Input Worksheet (FIG. 4) (sell to what percent of equity, fixed, total or holding).

Once this is known, the Sell Priority determines the order the lots will be chosen to meet the objective and then, the tax filters are applied. The order in which these last two steps are completed does not matter, as the filters are applied to all tax-lots, even those outside the objective. This gives the user flexibility in which lots he or she chooses to liquidate in order to meet the objective.

As illustrated in the preceding examples, the logic used in the preferred embodiment will result in tax lots that fail to trade as "Outside Objective" if the tax lots containing the percentage of shares to be traded, and selected in the order specified by the Sell Priority, otherwise fail to meet the other selection criteria. In other words, the system of the preferred embodiment will not continue to evaluate other lots beyond the initial selection of trading candidates if some or all of these candidate lots fail.

In an alternative embodiment of the invention, as distinct from what is described above, all of the tax lots of the selected security in a particular account could first be ordered in accordance with the Sell Priority for that account, and then the gain/loss and tax criteria applied to the tax lots successively until the desired percentage of shares are traded or the tax lots exhausted. If this alternative selection logic were applied to Example 2 above, then in addition to lot 6, lots 5, 4, 3 and 2, selected in LIFO order, would also appear in the trading report, and only Lot 1, the earliest purchase, would appear on the failure report.

Returning to the logic of the preferred embodiment, the following Table 5 will be used to illustrate each of the remaining failure reasons. Per unit data is being used to simplify the discussion. This security is currently trading at $30/share.

TABLE 5

Failure Reason Illustration

| Order of Purchase/ # Shares | Tax Term & Days to Rollover | Cost Per Unit | Unrealized Gain Per Unit | Tax Rate | Tax Liability/ Unit |
|---|---|---|---|---|---|
| 1 100 | L | 10 | +20 | 20% | $4.00 |
| 2 100 | L | 20 | +10 | 20% | $2.00 |
| 3 100 | L | 22 | +8 | 20% | $1.60 |
| 4 100 | L | 26 | +4 | 20% | $0.80 |
| 5 100 | L | 28 | +2 | 20% | $0.40 |
| 6 100 | L | 35 | −5 (loss) | 1 (loss) | −$5.00 |
| 7 100 | S 5 | 34 | −4 | 1 (loss) | −$4.00 |
| 8 100 | S 12 | 27 | +3 | 39.6% | $1.118 |
| 9 100 | S 186 | 20 | +10 | 39.6% | $3.96 |
| 10 100 | S 360 | 32 | −2 | 1 (loss) | −$2.00 |

In general, a Gains Only or Losses Only criterion cannot be satisfied when there are no, or there is not enough, tax-lots in the pool being evaluated. There is a tax-lot(s) with a Loss or a Gain remaining in those tax-lots selected for evaluation.

Using the tax-lots in the example of Table 5 above, if the user wants to sell 50% of the holding in the selected security, losses only, the user would set the Sell Priority to MinTax. That would effectively sort the tax-lots in descending order of their tax liability/share, regardless of tax term. Lots 6, 7 and 10 would sell (in that order), and lots 4 and 5 would fail for Loss only. If "Show all Tax-Lots" has been selected on the Template Screen, the remaining 5 would fail as Outside Objective.

If the Wash Sale Filter were turned on, lot number 10 would trigger the wash sale failure. If it has 360 days to rollover, it was purchased 5 days ago, or 6 days if leap year is applicable. (On leap year an investor has to hold an extra day to make the tax lot long term.)

In a Tax Term failure, there are no and/or not enough tax-lots which meet the tax term criteria Long, Medium, Short or any combination thereof. In the event that "any tax term" is chosen, this cannot fail (unless the security is unowned). This query is not run in the event that the "any tax term" choice is elected.

Using the above example, if the user were to sell 70% of the position, Long Term Only (gain or loss), lots 1-6 would trade and 7 would fail for Tax Term. Again, 8, 9 and 10 are Outside Objective (assuming FIFO).

The user has the option to exclude or include (And/Or) tax-lots with a further purchase date restriction. For instance, the user may want Gains Only, Any Tax Term, or only those lots purchased after Jan. 1, 1992 (i.e., The user does not want to trigger a very taxable event).

Assume for example, that Lot 1 is purchased in 1990, outside of the date specified. If the user were selling 50%, Long Term Only but not those purchased before 1990, lots 2-5 would trade, lot 1 would fail because of the date restriction. Here, only 40% of the holding would have sold. By viewing all tax-lots, the user would quickly view 5 others that were "Outside Objective" and could choose one from these 5 to make up for it (in this case, the user would choose lot 6 for gains only, or one of the losses).

Note that a user could conceivably enter criteria that simply could not be met (e.g., Long Term Only, Purchased after 'yesterday'; no tax-lot meets that criteria). The user could also enter a date range (if during which the security was purchased, it would currently be trading at a loss) and select gains only.

This brings up a second point which will be illustrated in the next failure reason. There are many ways to achieve trading goals; usually there is one way that is better than others. This should be kept in mind during the rest of this discussion.

The user should not trade short term gains that will be long term holdings in X amount of days or less. If a tax-lot's implications are going to drastically change in a short time, the user may want to wait. In the event that the user populates this option, the criterion becomes (assuming only this was chosen) Fail If:

PURCHASE DATE GTE TODAY−365 (short term lot)
AND
PURCHASE DATE GTE TODAY−(365−X) (not rolling over in X amount of days).

Using the tax-lots of table 5 the object is to sell 100% of the holding, but do not sell gains that are rolling over in 15 days or less. Lot 8 would fail, because it is a gain that is rolling over from short to long in 12 days. Lot 7 would trade, even though it is rolling over in 5 days, since it is a loss. All other tax-lots would also trade.

As was mentioned earlier, there are many ways to achieve one's goals, usually there is one way that is better than the other. Using combination of the Tax Term, Purchase Date and Short Term Rollover tools, the user has a 3-tier date-of-purchase querying system that is very powerful, and easy to use.

Next is a wash sale example of where the wrong implementation strategy will cost system processing time. There are two provisions of the wash sale rule: Buy Sell Buy (BSB) and Buy Buy Sell (BBS).

Using simplest terms, the wash sale prevents one from declaring a loss under two circumstances. One can always take a gain. A wash sale occurs when one sells a security at a loss and within 30 days before or after the sale, buys or acquires substantially identical securities. This can be broken down into its two components:

Buy Sell Buy (BSB):

If one has sold a security at a loss within the last 30 days, one cannot buy it back and still declare that loss.

Buy Buy Sell (BBS)

If one has purchased two lots of a security, one within the last 30 days, one cannot take a loss if there is a possible gain. One must liquidate all gains before taking the loss.

Using the above tax-lots of FIG. 5, if the Wash Sale option were turned on, lot 10 which has $2 loss/unit and 360 days to rollover (purchased 5 days ago) would trigger a wash sale if the user attempted to sell any of the losses. This would be true even if the lot purchased 5 days ago were trading at a gain.

In the present embodiment, this query requires a lot of CPU, or processing time. If the user is harvesting gains only, the wash sale option should not be activated.

The cost greater/less than or equal criterion checks the unit cost to see if it is GTE and/or LTE then inputs X and/or Y. If the unit cost fails to meet the criterion, the corresponding tax lot will appear on the Failure Screen with a Cost Criteria designation.

For example, in the tax-lots of Table 5, if the user attempted to trade 100% of the holding, but restricted to Cost Greater than or Equal to 11, Lot 1 would fail for Purchase Cost, but all other lots would trade.

For the % Gain/Loss GTE/LTE criteria, the user can input a % gain or loss, choose GTE/LTE and the eligible lots will be evaluated. In the event that some fail, they will do so with % Gain as the reason for failure.

In the previous example, the user could accomplish the same goal by % Gain LTE 173%. If, for example, a stock, which is trading at 30, was purchased for $11/share, it has a gain of 172.7272%. If the user imposes a restriction that the gain cannot exceed 173%, the $10/share purchase lot will fail for % Gain/Loss, as it has a 200% gain.

If any of the Tax Liability calculations are chosen as criteria (e.g., Tax Liability Greater/Less Than or Equal To) they will be queried as such and their reason for failure will be Tax Liability. Tax rates are stored at the account level and default values are currently set to 20% and 39.6% for long and short term holdings respectively.

For this Example #3, the user enters a day-count to long term next to short-term holding. The sell code is unimportant in this case, as the entire position is to be sold.

Both the sales and the failures are shown in Table 6 below for illustration purposes.

TABLE 6

Example #3

| Lot | Trade | Before What-If | Tax Term | Unrealized Gain/Loss | After What-If and Failure Reason |
|---|---|---|---|---|---|
| 1 | Yes | 100 | L | +10 | 0 |
| 2 | Yes | 100 | L | +9 | 0 |
| 3 | Yes | 100 | L | +8 | 0 |
| 4 | Yes | 100 | L | +7 | 0 |
| 5 | Yes | 100 | L | +6 | 0 |
| 6 | Yes | 100 | L | +5 | 0 |
| 7 | No | 100 | S 5 | +1 | 100 ST Rollover |
| 8 | Yes | 100 | S 12 | −1 (loss) | C (Wash Sale) |
| 9 | Yes | 100 | S 186 | −2 (loss) | 0 (Wash Sale) |
| 10 | Yes | 100 | S 241 | +1 | 0 |
| | | Total | 600 L | | 0 L Sells 900 |
| | | Remaining | 400 S | | 100 S-100 remain |

In this example, there are two lots that are rolling over in 15 calendar days or less. Lot 9 is a loss, so it does not matter whether it is short or long-term. Lot 7 has a gain whose tax implications are going to change in 5 days, so it will be displayed on the failure screen.

If Wash Sale were turned on, Lot 10 which was purchased within the last 30 days would nevertheless be unaffected because it shows a gain. Lots 8 and 9, both of which are trading at a loss, would be flagged for a wash sale violation. For illustrative purposes, assume lot 8 was trading at a $0.50 loss per share. If one were liquidating the entire position because one did not like the security, one might want to trade this lot even though the $50 loss is not declarable. That option is available in the failure screen, by changing the "NO" in the Trade Column to a Yes, the lot will write over into the block to be traded.

In example #4, illustrated in table 7, below, the object is to take long term gains, but only if the tax liability per share is less than $3.50/share. One could achieve this by using a number of Combinations of these filters. The easiest method would be to select Long Term Only, and Gains Only and populate the Tax Liability line with GTE, 3.5 as a $ value/unit. The attempt will be to sell 0%, or 100% of the holding so all tax-lots will appear on either the trade screen or the failure screen even if "Display Only Those Lots Requiring Change" was chosen in the template. In this case, therefore, Sell Priority is irrelevant. For this example, the tax lots will be viewed for convenience as if the Sell Priority was MinTax.

TABLE 7

Example #4

| Order of Purchase/ # Shares | Tax Term & Days to Roll-over | Cost Per Unit | Unrealized Gain Per Unit | Tax Rate | Tax Liability/ Unit | Remaining Shares or Failure reasons |
|---|---|---|---|---|---|---|
| 6 100 | L | 35 | −5 (loss) | 1 (loss) | −$5.00 | 0 |
| 7 200 | S 5 | 34 | −4 (loss) | 1 (loss) | −$4.00 | 0 |
| 10 100 | S 360 | 32 | −2 (loss) | 1 (loss) | −$2.00 | 0 |
| 5 100 | L | 28 | +2 | 20% | $.40 | 0 |
| 4 200 | L | 26 | +4 | 20% | $.80 | 0 |
| 8 100 | S 12 | 27 | +3 | 39.6% | $1.118 | 0 |
| 3 100 | L | 22 | +8 | 20% | $1.60 | 0 |
| 2 100 | L | 20 | +10 | 20% | $2.00 | 0 |
| 9 100 | S 186 | 20 | +10 | 39.6% | $3.96 | Tax Liability |
| 1 100 | L | 10 | +20 | 20% | $4.00 | Tax Liability |

Lots 1 and 9 (a long and a short term lot) do not trade because their tax liability is outside the imposed restriction. In more realistic cases this criterion would be used in conjunction with a gain restriction.

The preceding has described in detail the features available for generating "What-If" trading proposals using the MASS system, and provided several specific examples of their use, which are intended only to be illustrative of the usefulness, flexibility and power of this financial management tool.

Figure 11A:
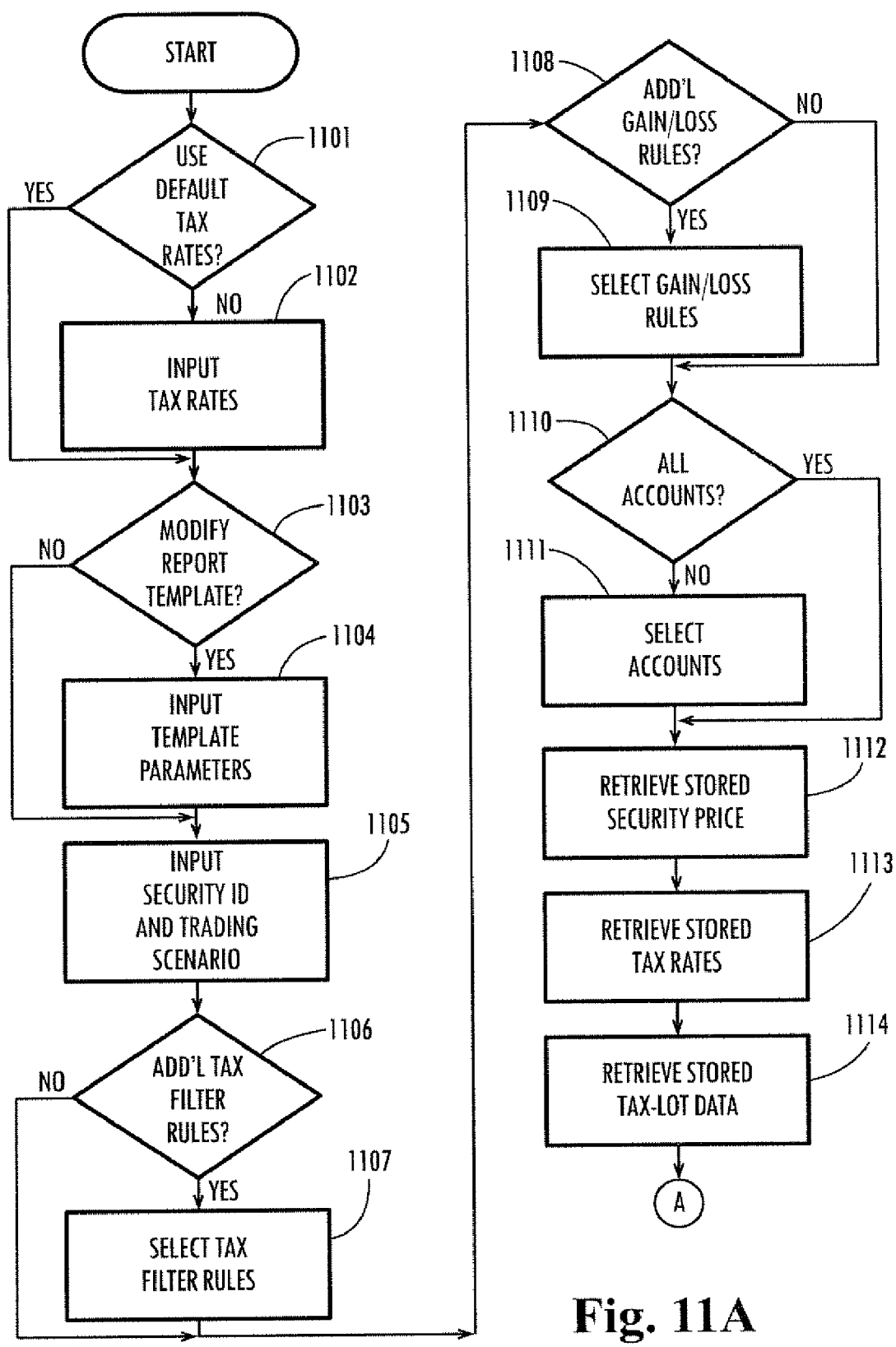
FIGS. 11A-11B are flow charts of the method for generating a trading proposal for a single security across a plurality of investment accounts according to the present invention.
Figure 11B:
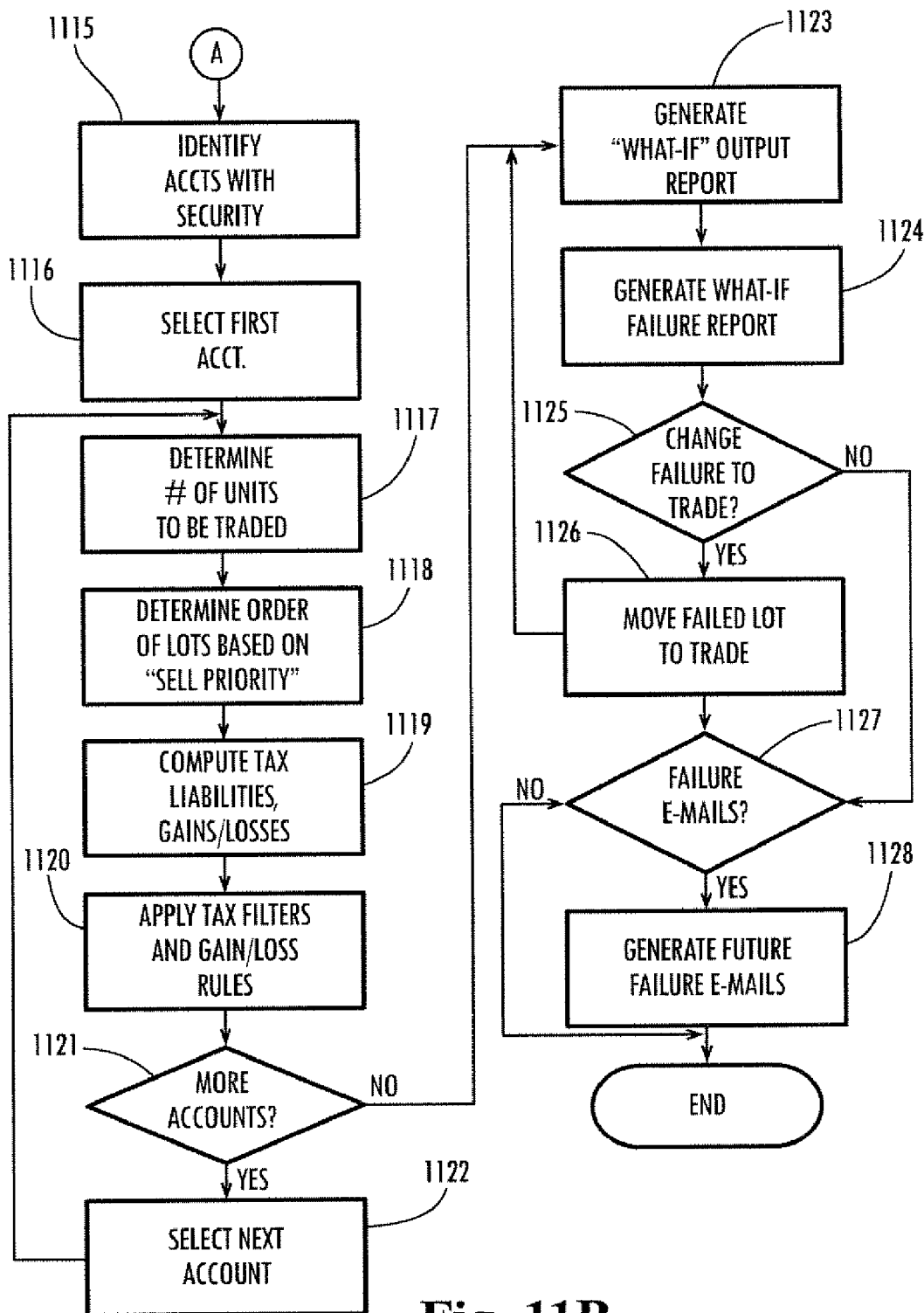

FIGS. 11A-B provide a summary in flow chart form of the method described above for generating trading proposals for tax lots of a single security across multiple accounts. The process begins with electing to use the default federal and state tax rates, at step 1101, or inputting different tax rates for one or more selected accounts either by account or by investor at step 1102 using the input screen shown in FIG. 2. Step 1102 would usually be done at set-up and probably does not require revisiting for each "What-If" scenario. In step 1103, the user may elect to use an existing template for the "What-If" trading report generated by the system, or modify the report parameters at step 1104, using the input screen shown in FIG. 3. At step 1105, the user inputs an identifier for the security to be traded and defines the basic trading scenario for the accounts holding the security in question (e.g., percentage of stock holding to be traded, minimum trading block size, round-off level for trading blocks). If an election is made by the user at step 1106 to apply additional tax filter rules, the user inputs the selected tax filter rules at step 1107 using the input screen shown in FIG. 5. Further, if the user elects at step 1108 to apply additional gain/loss rules, the program takes the user to the input screen shown in FIG. 6 for step 1109. The user must then decide at step 1110 whether the prospective trade will apply to all accounts, or proceed to step 1111 where specific accounts may be identified using the screen shown in FIG. 7.

At steps 1112, 1113 and 1114, the data necessary to generate a "What-If" output report is retrieved, including current bid and asked prices of the security to be traded, state and federal tax rates applicable to each account (either default values or actual values), and tax lot data, such as number of units (e.g., shares) purchased, purchase price and purchase date.

Computations begin at step 1115, where the accounts having an actual position in the selected security are identified. Then at step 1116 a first account is selected in accordance with the sorting criterion specified in the input screen of FIG. 3, and for that account the number of units to be traded is determined at step 1117 on the basis of the inputs provided by the user in the input screen of FIG. 4.

In the next step, step 1118, the tax-lots are put into the order in which they would be traded, based either on the individual account code (e.g., FIFO, LIFO) or on the Sell Priority specified through the input screen shown in FIG. 6. As part of the necessary computations, the system must compute, at step 1119, gains, losses and tax liabilities associated with each tax-lot in an account. Having done those computations, the tax filters and gain/loss rules inputted earlier can be applied at step 1120, to make a final determination of which tax-lot(s) or portions thereof can be traded in accordance with all inputted criteria. Steps 1117-1120 are repeated for the next account at step 1122, until all accounts have been processed at step 1121.

As noted earlier, the order of steps 1118 and steps 1119/1120 are not critical because tax computations are done in the preferred embodiment for all tax lots. In certain circumstances, such as tax exempt accounts, the preferred embodiment bypasses steps 1119 and 1120 entirely. It will be readily apparent to those skilled in the art that alternative embodiments of the inventive method are possible in which some filtering that does not require the gain/loss and tax calculations (e.g., purchase date or price criteria), may be applied first to narrow the set of candidate tax lots for trading, rather than do calculations on all.

At step 1123, the computed results for all of the selected accounts are used to generate a "What-If" output report, formatted in accordance with the template selected in steps 1103, 1104, and identifying the tax-lots in each account to be traded. A "What-If" Failure Report is generated at step 1124, to identify the tax-lot(s) or portions thereof, that would not trade for the any one of the various failure reasons discussed earlier. At step 1126, any one or more of the failed lots or portions thereof, may be moved to the output report for trading. The last steps shown on FIG. 11B involve the user option at step 1127 to have e-mails automatically sent by the system in the future as a reminder to review failed lot transactions when the cause of failure (e.g., wash sale, short-to-long term transition) may no longer be relevant. The future failure e-mails generated in step 1128, may have the form shown in FIG. 10.

Not expressly shown in FIG. 11B is the generation of a trade request to actually carry out the proposed securities transactions after the "What-If" report (step 1123) have been reviewed and any failed lots have been moved to the trading report (step 1126). Any such trading request could be generated directly from the data in the final trading proposal.

Also not explicitly shown in FIG. 11B is the permanent storage of the reports and/or final trade requests, or the updating of individual investor accounts to reflect the completed securities transactions based on the final trade requests. These are all part of normal record keeping.

Although the preferred embodiment of the present invention operates on a server and is accessed through networked PC's operating in the terminal-emulation mode, it will be apparent to a person of ordinary skill in the art that the system can be modified to operate on a stand-alone workstation, personal computer or any other computer environment with appropriate resources.

It should be pointed out that the present invention is not intended to be used individually, but as part of a more comprehensive financial planning package, which includes other securities trading tools, such as the SAMS system described earlier. As an adjunct to MASS, SAMS can be applied to individual accounts where, for example, MASS has not fully satisfied the investor's objectives with trading in a single security.

It should also be noted that MASS, while primarily intended for taxable securities transactions, can handle tax-exempt transactions as well. This is done by coding the account as "Exempt" in a certain field of the account profile. In such case all gain/loss and tax filters are ignored in the present embodiment, on the premise that in investment manager is making decisions based on a particular stock, not on gains or losses because the tax consequences do not matter. Other methods of handling tax exempt accounts or securities in the present invention should be readily apparent to those knowledgeable in the art.

Although the present invention has been discussed within the context of trading in a single security, that single could be a basket of securities, such as a mutual fund that is represented by a single price, or even a class of securities, such as tech stocks, for which the market maintains an index.

In the present invention, the after tax performance of a particular security could be tracked across accounts by accumulating the data from a series of trades over a period of time, such as a year.

In general, the present invention is not to be limited in scope by the specific embodiments described herein. Various modifications will be readily apparent to those of ordinary skill in the art based on a review of the specification and drawings, and it is intended that such modifications fall within the scope of the following claims.

What is claimed is:

1. A method comprising:
   receiving at least one tax selection criterion associated with tax implications;
   generating a first wading proposal for tax lots of a single security across a plurality of investor accounts that satisfy the at least one tax selection criterion, wherein a tax lot comprises a holding of a single security purchased at a single price on a particular date;
   storing a failure report comprising any tax lots of the single security across the plurality of investor accounts that do not satisfy the at least one tax selection criterion, wherein the tax lots included in the failure report are prevented from being traded; and
   moving a tax lot from the failure report to one of (i) the first trading proposal and (ii) a second trading proposal generated subsequent to the first trading proposal, wherein the moved tax lot is enabled to be traded.

2. The method of claim 1, wherein the selection criterion includes identification of the single security, and at least one of (i) identification of at least one criterion corresponding to the tax lots, and (ii) identification of at least one criterion corresponding to the plurality of accounts.

3. The method of claim 2, wherein the identified at least one criterion includes at least one of tax filter rules and gain/loss rules.

4. The method of claim 3, wherein the tax filter rules include at least one of a short term rollover criterion and a wash sale criterion.

5. The method of claim 3, wherein the gain/loss rules include selection criteria based on at least one of cost, gain, loss and tax liability.

6. The method of claim 2, wherein the at least one account criterion includes one of selecting as the plurality of accounts all accounts for which account profiles are maintained and selecting the plurality of accounts from the accounts for which account profiles are maintained based on selected account profile information.

7. The method of claim 1, further comprising:
   receiving security price information for the single security;
   receiving tax rate information for each of the plurality of accounts; and
   receiving tax lot information for each of the plurality of accounts;
   wherein the generating of the trading proposal includes computing gain/loss and tax liability information for each of the tax lots, applying the at least one selection criterion to the computed gain/loss and tax liability information, and identifying the computed gain/loss and tax liability information for tax lots that satisfy the at least one selection criterion.

8. The method of claim 7, further comprising:
   outputting at least one of the trading proposal and the failure report, wherein the failure report includes the computed gain/loss and tax liability information for tax lots that do not satisfy the at least one selection criterion.

9. The method of claim 8, further comprising:
   generating reminders to review tax lots identified in the failure report; and
   automatically transmitting the reminders on one or more future dates when the cause of the failure to satisfy the at least one selection criterion is no longer applicable.

10. The method of claim 9, wherein the reminders are generated with respect to failed tax lots that are user selected.

11. The method of claim 8, wherein at least one of the format and content of the failure report are user selectable.

12. The method of claim 7, wherein at least one of the format and content of the trading proposal are user selectable.

13. An article of manufacture comprising:
a computer readable medium; and
computer programming stored on the computer readable medium, wherein the stored computer programming is configured to be readable from the computer readable medium by a computer to thereby cause the computer to operate so as to;
receive, via an input device, at least one tax selection criterion associated with tax implications;
generate a first trading proposal, for tax lots of a single security across a plurality of investor accounts that satisfy the at least one tax selection criterion, wherein a tax lot comprises a holding of a single security purchased at a single price on a particular date;
store a failure report comprising any tax lots of the single security across the plurality of investor accounts that do not satisfy the at least one tax selection criterion, wherein the tax lots included in the failure report are prevented from being traded; and
move a tax lot from the failure report to one of (i) the first trading proposal and (ii) a second trading proposal generated subsequent to the first trading proposal, wherein the moved tax lot is enabled to be traded.

14. The article of manufacture of claim 13, wherein the at least one selection criterion includes identification of the single security, and at least one of (i) identification of at least one criterion corresponding to the tax lots, and (ii) identification on at least one criterion corresponding to the plurality of accounts.

15. The article of manufacture of claim 14, wherein the identified at least one criterion includes at least one of tax filter rules and gain/loss rules.

16. The article of manufacture of claim 15, wherein the tax filter rules include at least one of a short term rollover criterion and a wash sale criterion.

17. The article of manufacture of claim 15, wherein the gain/loss rules include selection criteria based on at least one of cost, gain, loss and tax liability.

18. The article of manufacture of claim 14, wherein the at least one account criterion includes one of selecting as the plurality of accounts all accounts for which account profiles are maintained, and selecting the plurality of accounts from the accounts for which account profiles are maintained, based on selected account profile information.

19. The article of manufacture of claim 13, wherein, in order to generate the trading proposal, the computer readable medium is further readable to cause the computer to:
receive security price information for the single security;
receive tax rate information for each of the plurality of investor accounts; and
receive tax lot information for each of the plurality of investor accounts;
wherein the generation of the trading proposal includes computing gain/loss and tax liability information for each of the tax lots, applying the at least one selection criterion to the computed gain/loss and tax liability information, and identifying the computed gain/loss and tax liability information for tax lots that satisfy the at least one selection criterion.

20. The article of manufacture of claim 19, wherein the computer readable medium is further readable to cause the computer to;
output at least one of the trading proposal and the failure report, wherein the failure report includes the computed gain/loss and tax liability information for tax lots that do not satisfy the at least one selection criterion.

21. The article of manufacture of claim 20, wherein the computer readable medium is further readable to cause the computer to:
generate reminders to review tax lots identified in the failure report; and
automatically transmit the reminders on one or more future dates when the cause of the failure to satisfy the at least one selection criterion is no longer applicable.

22. The article of manufacture of claim 21, wherein the reminders are generated with respect to failed tax lots that are user selected.

23. The article of manufacture of claim 20, wherein at least one of the content and format of the failure report are user selectable.

24. The article of manufacture of claim 19, wherein at least one of the content and format of the trading proposal are user selectable.

25. A system comprising:
a memory configured to store tax lot information for securities held in multiple investor accounts; and
a processor configured to receive at least one tax selection criterion associated with tax implications from an input device, to generate a first securities trading proposal for tax lots of a single security across a plurality of the multiple investor accounts that satisfy the at least one tax selection criterion, wherein a tax lot comprises a holding of a single security purchased at a single price on a particular date, to store in the memory a failure report comprising any tax lots of the single security across the plurality of investor accounts that do not satisfy the at least one tax selection criterion, wherein the tax lots included in the failure report are prevented from being traded, and to move a tax lot from the failure report to one of (i) the first trading proposal and (ii) a second trading proposal generated subsequent to the first trading proposal, wherein the moved tax lot is enabled to be traded.

26. The system of claim 25, wherein the received at least one selection criterion includes identification of the single security, and at least one of (i) identification of at least one criterion corresponding to the tax lots, and (ii) identification of at least one criterion corresponding to the plurality of accounts.

27. The system of claim 26, wherein the identified at least one criterion includes at least one of tax filter rules and gain/loss rules.

28. The system of claim 27, wherein the tax filter rules include at least one of a short term rollover criterion and a wash sale criterion.

29. The system of claim 27, wherein the gain loss rules include selection criterion based on at least one of cost, gain, loss and tax liability.

30. The system of claim 26, wherein the identified at least one account criterion includes one of selecting as the plurality of accounts all accounts for which account profiles are maintained, and selecting the plurality of accounts from the accounts for which account profiles are maintained, based on selected account profile information.

31. The system of claim 25, wherein the processor is further configured to:
receive security price information for the single security;
receive tax rate information for each of the plurality of accounts; and
retrieve the stored tax lot information for each of the plurality of accounts;

wherein the generation of the wading proposal includes computing gain/loss and tax liability information for each of the tax lots, applying the at least one selection criterion to the computed gain/loss and tax liability information, and identifying the computed gain/loss and tax liability information for tax lots that satisfy the at least one selection criterion.

32. The system of claim 31, wherein the processor is further configured to output to an output device at least one of the trading proposal and the failure report, wherein the failure report includes the computed gain/loss and tax liability information for tax lots that do not satisfy the at least one selection criterion.

33. The system of claim 32, wherein the processor is further configured to:
generate reminders to review tax lots identified in the failure report; and
automatically transmit the reminders on one or more future dates when the cause of the failure to satisfy the at least one selection criterion is no longer applicable.

34. The system of claim 33, wherein the reminders are generated with respect to failed tax lots that are user selected.

35. The system of claim 32, wherein at least one of the content and format of the failure report are user selectable.

36. The system of claim 31, wherein at least one of the content and format of the
trading proposal are user selectable.

37. A method comprising:
receiving at least one tax selection criterion associated with tax implications, including identification of a single security;
receiving security price information for the single security;
receiving tax rate information for each of a plurality of accounts;
receiving tax lot information for tax lots of the single security in each of the plurality of accounts;
generating a first securities wading proposal for the tax lots of the single security across the plurality of accounts that satisfy the at least one selection criterion, the security price information, the tax rate information, and the tax lot information, wherein a tax lot comprises a holding of a single security purchased at a single price on a particular date;
storing a failure report comprising any tax lots of the single security across the plurality of investor accounts that do not satisfy the at least one tax selection criterion, wherein the tax lots included in the failure report are prevented from being traded; and
moving a tax lot from the failure report to one of (i) the first trading proposal and (ii) a second trading proposal generated subsequent to the first trading proposal, wherein the moved tax lot is enabled to be traded.

38. The method of claim 1, further comprising prior to moving the tax lot from the failure report to the second trading proposal, transmitting a reminder when a cause of the failure of the at least one selection criterion is no longer relevant.

39. The article of manufacture of claim 13, wherein prior to moving the tax lot from the failure report to the second trading proposal, the computer readable medium is further readable to cause the computer to transmit a reminder when a cause of the failure of the at least one selection criterion is no longer relevant.

40. The system of claim 25, wherein the processor is further configured to, prior to moving the tax lot from the failure report to the second trading proposal, transmit a reminder when a cause of the failure of the at least one selection criterion is no longer relevant.

41. The method of claim 37, further comprising prior to moving the tax lot from the failure report to the second trading proposal, transmitting a reminder when a cause of the failure of the at least one selection criterion is no longer relevant.

* * * * *

UNITED STATES PATENT AND TRADEMARK OFFICE
CERTIFICATE OF CORRECTION

PATENT NO. : 7,330,831 B2  Page 1 of 1
APPLICATION NO. : 09/893596
DATED : February 12, 2008
INVENTOR(S) : Biondi et al.

It is certified that error appears in the above-identified patent and that said Letters Patent is hereby corrected as shown below:

Column 20, Line 1 – Change "wading" to --trading--

Column 21, Line 10 – Change ";" to --:--

Column 21, Line 31 – Change "on" to --of--

Column 21, Line 65 – Change ";" to --:--

Column 23, Line 1 – Change "wading" to --trading--

Column 23, Line 39 – Change "wading" to --trading--

Signed and Sealed this

Fourth Day of May, 2010

David J. Kappos
*Director of the United States Patent and Trademark Office*